June 19, 1923.  
E. P. CLAUSS  
ANGLE COCK  
Filed May 7, 1921
1,459,654
2 Sheets-Sheet 1
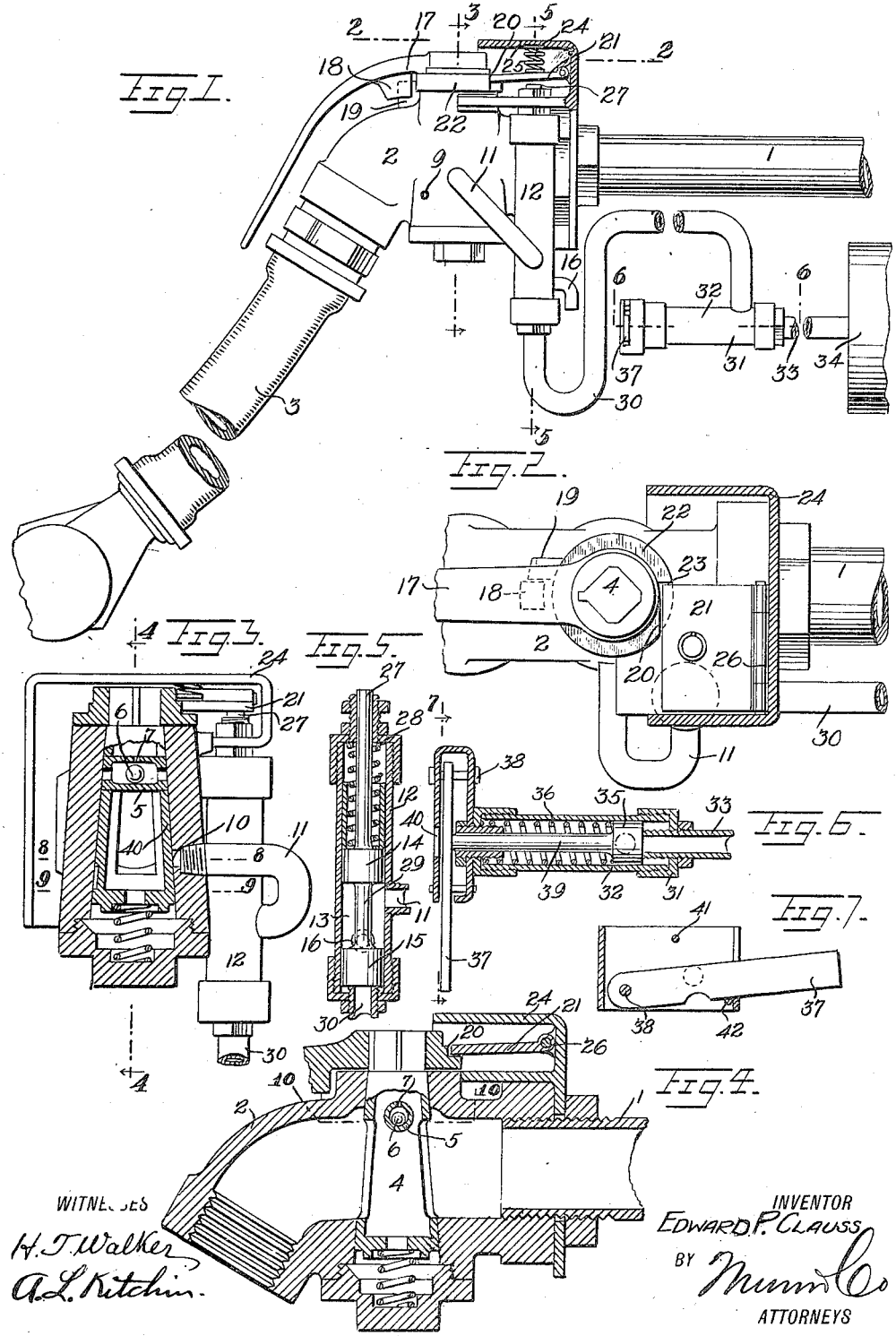
WITNESSES  
H. T. Walker  
A. L. Kitchin
INVENTOR  
EDWARD P. CLAUSS  
BY Munn & Co  
ATTORNEYS

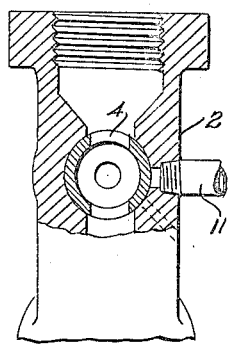
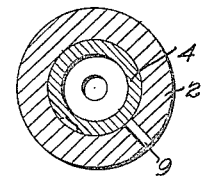
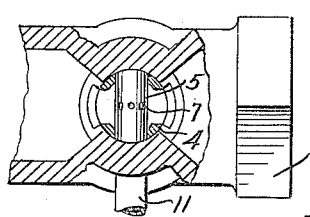
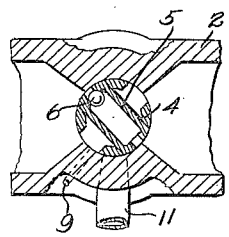
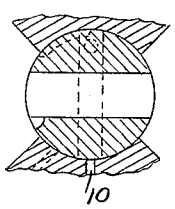
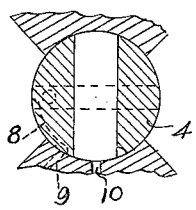
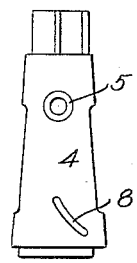
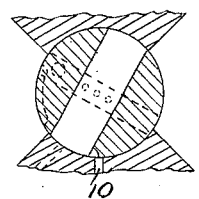
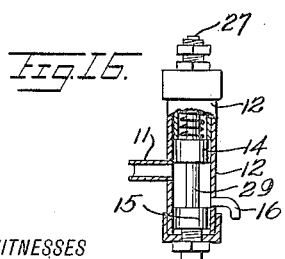
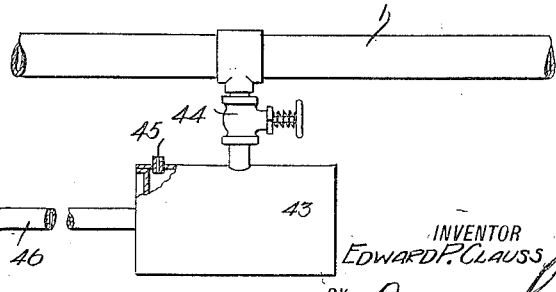

Patented June 19, 1923.

1,459,654

UNITED STATES PATENT OFFICE.

EDWARD P. CLAUSS, OF LYONS, NEW YORK.

ANGLE COCK.

Application filed May 7, 1921. Serial No. 467,533.

*To all whom it may concern:*

Be it known that I, EDWARD P. CLAUSS, a citizen of the United States, and a resident of Lyons, in the county of Wayne and State of New York, have invented a new and Improved Angle Cock, of which the following is a full, clear, and exact description.

This invention relates to air brake systems for trains and particularly to an angle cock and associated parts and has for an object to provide an improved construction wherein the angle cock cannot be closed or shut off until the brakes have been applied.

Another object of the invention is to provide an arrangement whereby a setting lever must be operated before the angle cock can be shut off, the arrangement being such that the setting lever is placed from the angle cock at such a distance that an operator cannot touch the setting lever and angle cock at the same time.

A further object of the invention is to provide an angle cock structure and means associated therewith whereby after the angle cock has been operated the line in back thereof will be bled freely and the various parts except the angle cock lever will resume their former position automatically ready to lock the angle cock when moved to an open position.

A further object of the invention is to provide an angle cock constructed according to my Patent No. 1,403,293, issued January 10, 1922, and to connect thereto certain mechanism which will automatically lock the cock open.

In the accompanying drawings—

Figure 1 is a side view of an angle cock and associated parts disclosing one embodiment of the invention.

Figure 2 is a fragmentary sectional view through Figure 1 on line 2—2.

Figure 3 is a sectional view through Figure 1 on line 3—3.

Figure 4 is a sectional view through Figure 3 on line 4—4.

Figure 5 is a fragmentary sectional view through Figure 1 on line 5—5.

Figure 6 is a fragmentary horizontal sectional view through Figure 1 on line 6—6.

Figure 7 is a vertical sectional view through Figure 6 on line 7—7.

Figure 8 is a fragmentary sectional view through Figure 3 on line 8—8.

Figure 9 is a fragmentary sectional view through Figure 3 on line 9—9.

Figure 10 is a fragmentary sectional view through Figure 4 on line 10—10.

Figure 11 is a view similar to Figure 10 but showing the parts in a different position.

Figure 12 is a side elevation of the valve plug shown in Figure 3.

Figure 13 is a diagrammatic view showing the position of the plug and associated parts when the cock is fully open.

Figure 14 is a view similar to Figure 13 but showing the cock on the point of completely closing.

Figure 15 is a view similar to Figure 13 but showing the valve completely closed.

Figure 16 is a fragmentary view with certain parts broken away illustrating how the construction shown in Figure 1 may be applied to a freight car.

In the ordinary brake system now in common use on the railroads, an angle cock is used at each end of each car and suitable piping and other attachments are associated therewith including an engineer's valve whereby he may turn on air to the brake system or open the brake system to the atmosphere in order to apply the brakes. If all persons properly operated the various parts of the brake system including the angle cocks, the system would work entirely satisfactory at all times but it has been found that careless persons will fail to properly operate the angle cocks and in some instances unauthorized persons will turn the angle cocks while a train is in motion with a view of applying the brakes and stopping the train so as to easily dismount from the train at some desired point. This action has in some instances resulted in the wrecking of a train as it took control of the brakes from the engineer.

In the present instance it is aimed to provide a construction which will automatically apply the brakes in case any angle cock is open so that when control is taken from the engineer the very action of taking the control from him will result in applying the brakes in the same manner as if he had applied the same. However, in order to prevent even the application of the brakes by an unauthorized person, a special construction has been provided as shown in Figure 1 which will require the operator of the angle cock to stand on the ground a short distance from the angle cock and operate a control lever before the angle cock can be operated, the arrangement being such that the control lever will only function when the brakes are already applied. This construction, therefore, absolutely prevents an unauthorized person from turning off the angle cocks when the train is in motion and prevents anyone from turning off the angle cocks until the brakes have been applied.

Referring to the accompanying drawings by numeral, 1 indicates part of the ordinary line of piping of air brake systems, said piping having the angle cock 2 secured thereto in the usual manner, said angle cock carrying a connecting hose 3 of any usual or preferred structure. The general structure of the angle cock 2 is the same as now in common use and, therefore, will not be described in detail but only the modified portion thereof. The plug 4 of the cock 2 is provided with a tubular member 5 forming a passage-way from one side of the plug to the other, said pipe carrying a valve member 6 whereby either end of the pipe may be closed according to the pressure on the opposite sides of the ball. A number of apertures 7 are arranged in pipe 5 so that air entering either end of the pipe may escape into the plug 4 and thence out suitable bleeding openings. This arrangement permits the bleeding of the entire brake system as soon as the control is taken from the engineer or until the angle cock has been completely closed. As the plug moves from the position shown in Figure 10, it gradually assumes the position shown in Figures 11 and 14 and finally assumes the position shown in Figure 15. After it reaches the position shown in Figure 15, a by-pass 8 exhausts through the opening 9 as fully described in my co-pending application above referred to while the forward section of the system gradually bleeds through the pipe or tube 5 and out the aperture 10. The air passing in this direction enters the pipe 11 which is connected with a cylinder 12 and discharges into the opening 13 between the pistons 14 and 15 whereby it may freely pass out the discharge pipe 16 when the parts are in the position shown in Figure 5. In this way both the front and rear portions of the system will be bled.

In order to lock the cock against closing except under proper circumstances, the handle 17 is prevented movement in one direction by the lug 18 thereon striking the lug 19 on the casing of the cock while the shoulder 20 engages a locking plate 21 and prevents movement in the opposite direction. It will be understood that the handle 17 is permanently secured to the end of the plug 4 by any suitable means, as for instance, a rivet. As indicated in Figures 1 and 2, the handle 17 is provided with an annular flange 22 which is formed with a notch 23 whereby the shoulder 20 may be readily presented to the lock plate 21. A spring 24 engages the casing 25 and the plate 21 for normally holding the plate in a lowered and locked position. The casing 25 may be connected with the cock 2 in any desired manner and is intended to cover the plate 21 so that access cannot be secured thereto by an unauthorized person or even by an authorized person without breaking some of the parts or disconnecting the entire structure. The arrangement of the flange 22 and the notch 23 is such that when the plate 21 is raised above the flange 22, handle 17 may be rotated and when moved around to a closed position, the plate 21 will rest on the upper surface thereof and will merely slide thereover when the handle is moved back but will automatically snap into the notch 23 when the cock is again fully opened.

The plate 23 is suitably pivotally mounted at 26 and is acted upon by a plunger 27, which plunger is in fact the piston rod connected with the piston 14 (Fig. 5). A spring 28 acts against one end of the cylinder 12 and at the other end acts against the piston 14 for normally holding the piston in a lowered position as shown in Figures 1 and 5. When pressure is brought to bear on the lower surface of piston 15, which is connected to piston 14 by a connecting section 29, said piston 14 and plunger 27 will be quickly raised and will in turn raise the plate 21 out of engagement with the shoulder 20. When this has been done the handle 1 may be rotated approximately 90° for fully turning off the cock. When the cock is thus fully turned off, the air brake system to the rear of the cock bleeds through the aperture 9 by reason of the passage-way 8 while the system in front attempts to bleed through passage-way 10 and pipe 11 but at this time the piston 15 is covering a port or opening between the cylinder 12 and the pipe 11 so that no air can escape therethrough. In order to provide a supply of compressed air to the lower surface of piston 15 in order to perform the operations above described, the bottom of the cylinder 12 has pipe 30 secured thereto which pipe extends a suitable distance to the control member 31. This control member is formed with a cylindrical body 32 having a pipe 33 connected with one end thereof, said pipe in turn being connected to the engineer's brake system 34. As is well known, when the engineer desires to apply the brakes, air is bled by the engineer from the train line and stored air from the auxiliary reservoir of each car passes into the end of the brake cylinder 34 for applying the brakes. When this has occurred, pipe 33 will be supplied with compressed air and, consequently, the compressed air will act on the piston 35 (Fig. 6) and give the same a tendency to move against the action of spring 36. A hand operated lever 37 is pivotally mounted at 38 and is normally in front of the piston rod 39 which bears against lever 37. The piston 35 does not move unless someone raises lever 37 pivotally until it slips off of the rod 39 whereupon rod 39 will be projected through the opening 40 and the piston 35 will move away from the point where the pipe 30 enters the casing 32 whereupon air will pass through said pipe 30 and act on the piston 15 for raising the same until the end of pipe 11 has been covered and plunger 27 has been raised sufficiently to disengage plate 21 from the flange 22.

Pins 41 and 42 limit the pivotal movement of lever 37 whereby when the pressure in the train line pipes 1 is restored and the brake cylinders 34 exhausted, piston 35 will automatically move back to the position shown in Figure 6 and lever 37 will automatically drop down in front of the piston rod 39 so as to hold the parts against movement until lever 37 has been again manually actuated. After the plate 21 has been raised, lever 17 may be quickly shifted to close the cock 2 and by reason of the position of the piston 15 the air system in front of the cock which has been operated will not be exhausted or bled while the system in the rear thereof will be bled through opening 9. As the device can be only operated when the brakes are already applied, the bleeding through aperture 9 will be comparatively small. In case the cock 2 is left closed and the rear car is removed, a dummy coupler is applied to cock 2 and then the cock opened. This will prevent any bleeding through the pipe 11 and associated parts. The lever 37 is positioned a sufficient distance from the handle 17 to prevent the operator from operating both of these members at the same time. Preferably, lever 37 is arranged an appreciable distance away from the cock 2 so that the trainman must be on the ground in order to operate this handle. This will positively prevent any persons from shutting off the cock 2 when the train is in motion and also prevent anyone from operating the cock from the platform of the car.

In Figure 16 will be seen a modified form of the invention which is particularly adapted for freight cars though the structure shown in Figure 1 could be used if desired. However, in long freight trains it requires considerable time to apply the brakes and also considerable time to release the brakes so that for many reasons it is desirable to have an arrangement whereby any car or number of cars may be cut off without applying the brakes to the entire train. In carrying out this idea, a comparatively small reservoir 43 is connected to the main train line 1 by means of a pipe and valve 44, said valve being of a spring type which will automatically close when released but which may be manually operated and held open for any desired length of time. The reservoir 43 is provided with a small vent 45 and is connected to pipe 46 to the bottom of the cylinder 12, which cylinder and associated parts are identical with the construction shown in Figure 1 so that they will need no further description. The valve 44 could be connected to an auxiliary reservoir or to any suitable air supply as the function for the reservoir 43 is merely to provide air for releasing purposes.

In using this form of the invention, it is intended to have the trainman turn on valve 44 and hold the same open until reservoir 43 has been provided with the pressure desired which will automatically act to raise the piston 15 and associated parts including the plunger 27 whereupon the locking plate 21 is released and the cock is in condition to be turned to a closed position. The vent 45 is very small and, consequently, air can be supplied to the reservoir 43 in sufficient volume to provide ample pressure for actuating the piston 15 for a sufficient time to allow the trainman to turn off the cock before the pressure in reservoir 43 has been reduced to a low pressure. Eventually, the vent 45 will permit the pressure to be reduced to atmospheric pressure. A reservoir 43 is arranged at each end of the freight cars and when it is desired to cut out one or more of the cars, one of the trainmen will temporarily hold open the valve 44 and will then release said valve and step over and shut off the angle cock which will insure a sufficient pressure for holding the piston 15 elevated. After this has been done, the trainman pays no more attention to the reservoir 43 which will automatically be vented by the vent opening 45.

What I claim is:—

1. In an air brake system for railway cars an angle cock, a lock for locking the same open, pneumatic means for unlocking said lock and a manually actuated member for causing said pneumatic means to function.

2. In an air brake system for trains an angle cock provided with a shoulder, a locking plate co-acting with said shoulder for holding the angle cock in an open position and means set in motion from a distance for releasing said locking plate.

3. In an air brake system for trains an angle cock provided with a member for turning the same on and off, said member being formed with a shoulder, a locking plate adapted to engage said shoulder and prevent the angle cock from being closed, a movable member for shifting said locking plate to a position out of engagement with said shoulder, pneumatically actuated means for actuating said movable member and a manually actuated lever for controlling said pneumatic means.

4. In an air brake system for cars an angle cock provided with means for actuating the same, said means being formed with a shoulder, a pivotally mounted stop adapted to be brought into engagement with said shoulder for preventing the movement of the cock to a closed position, a spring normally holding said stop in position to interlock with said shoulder, a reciprocating plunger for moving said stop out of engagement with said shoulder and manually controlled pneumatic means for moving said reciprocating member.

5. In an air brake system for cars an angle cock, a handle for operating the angle cock, said handle being formed with a shoulder, a locking member engaging said shoulder for locking the cock open, pneumatic means for actuating said stop and moving the same to a position out of engagement with said shoulder, said pneumatic means being connected with the brake cylinder of the car, and manually actuated means for causing the pneumatic means to function.

6. In an air brake system for cars, an angle cock of the usual construction provided with an operating handle for opening and closing said cock, said handle having a stop, a locking member normally engaging said shoulder for locking the handle against operation, a movable member for moving said locking member, a piston for moving said movable member, a cylinder for said piston, means for connecting said cylinder with the brake cylinder of said car whereby when the brakes are applied to the car air will be supplied to said piston for moving the same and causing said locking member to be moved away from said shoulder, and manually actuated means for controlling the air passing from said brake cylinder to the first mentioned cylinder.

7. In an air brake system for cars, an angle cock, means for locking the angle cock against closing, a reciprocating member for moving said means to an unlocked position, a piston connected with said reciprocating member, a cylinder surrounding said piston, tubular means connecting said cylinder with the brake cylinder of said car and manually actuated means acting as a valve mechanism controlling the passage of air from the brake cylinder to the first mentioned cylinder, whereby said cock may be unlocked only when the brakes are applied.

8. In an air brake system for cars, an angle cock, means for locking the angle cock against closing, said means comprising a pivotally mounted plate, a casing enclosing said plate and part of the angle cock so that no one can interfere with the action of said plate, pneumatically actuated means actuated with the brake system of said car for shifting said plate to an unlocked position and a manually actuated member for controlling the air from said brake cylinder.

9. In an air brake system for cars, an angle cock, means for locking the angle cock closed, said means including a movable locking member, pneumatic means for shifting said movable locking member to an unlocked position, said pneumatic means being connected with the brake cylinder of said car and manually controlled mechanism controlling the passage of air from said brake cylinder, said mechanism comprising a tubular member connected at one end with the pneumatic actuating means, a piston in the tubular member normally closing said tubular member, a spring acting as a piston for normally holding the same in a given position and a manually actuated lever for holding said piston in a given position whereby air cannot enter the pneumatically actuated means, said lever being movable manually to the position out of the way of said piston whereby the air from said brake cylinder will move the piston against the action of said spring and will then pass to said pneumatically actuated means for actuating the same.

EDWARD P. CLAUSS.